(12) United States Patent
Kaji et al.

(10) Patent No.: US 7,750,599 B2
(45) Date of Patent: Jul. 6, 2010

(54) BATTERY CHARGER

(75) Inventors: Eiji Kaji, Kanagawa (JP); Norio Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 565 days.

(21) Appl. No.: 11/787,549

(22) Filed: Apr. 17, 2007

(65) Prior Publication Data
US 2007/0247110 A1    Oct. 25, 2007

(30) Foreign Application Priority Data
Apr. 19, 2006    (JP)    .............. P2006-115664

(51) Int. Cl.
*H02J 7/00*    (2006.01)
(52) U.S. Cl. ....................... 320/107
(58) Field of Classification Search .............. 320/106, 320/107, 110, 111, 112, 113, 114, 115; 429/97, 429/100; D13/103, 107
See application file for complete search history.

(56) References Cited

U.S. PATENT DOCUMENTS 3,209,230 A * 9/1965 Mas ........................ 320/110
2005/0162128 A1 * 7/2005 Ebine ...................... 320/114
2005/0189905 A1 * 9/2005 Liang et al. ............... 320/107

FOREIGN PATENT DOCUMENTS

JP    2594139    12/1996

* cited by examiner

*Primary Examiner*—Edward Tso
*Assistant Examiner*—M'Baye Diao
(74) *Attorney, Agent, or Firm*—Frommer Lawrence & Haug LLP; William S. Frommer; Thomas F. Presson

(57) ABSTRACT

A charger configured to charge a battery includes a battery storage chamber configured to accommodate the battery; an opening formed on a first end of the battery chamber in a depth direction, the battery being attached to and detached from the battery storage chamber through the opening; a charger-side terminal provided on the battery storage chamber, the charger-side terminal being connect to and disconnect from a battery-side terminal of the battery stored in the battery storage chamber; and an attaching and detaching mechanism configured to prevent the battery from moving toward the opening while the battery is stored in the battery storage chamber and the battery-side terminal and the charger-side terminal are connected and to eject a second end of the battery in the depth direction from the opening by disconnecting the battery-side terminal and the charger-side terminal.

14 Claims, 13 Drawing Sheets

BATTERY CHARGER

CROSS REFERENCES TO RELATED APPLICATIONS

The present invention contains subject matter related to Japanese Patent Application JP 2006-115664 filed in the Japanese Patent Office on Apr. 19, 2006, the entire contents of which are incorporated herein by reference.

BACKGROUND OF THE INVENTION

1. Field of the Invention

The present invention relates to a battery charger.

2. Description of the Related Art

Broadcasting equipment used at broadcasting stations includes, for example, video cameras, video tape recorders (VTRs), and audio transmitters.

Some types of broadcasting equipment are driven by batteries so that they can be used when electrical outlets are not available, such as outdoors or while traveling.

Power consumption of many of such types of broadcasting equipment is great compared with other commercial equipment, and a battery having an electrical power of about 60 to 90 W is required. Therefore, the battery has a great size of, for example, a height of 6 cm, a width of 10 cm, a depth (length) of 17 cm.

The battery charger for charging a battery includes a case to be mounted on a desk or a shelf, a battery attachment portion formed with an upward opening in the upper surface of the case for attaching the battery from the above, a charger-side terminal provided on the battery attachment portion, a charger control circuit that is provided inside the case, and a power cable that is connected to a electrical outlet and supplies electrical power to the charger control circuit (refer to Japanese Patent No. 2594139).

SUMMARY OF THE INVENTION

When using battery-driven broadcasting equipment, the driving time of one battery is limited. Therefore, in many cases, several charged batteries are prepared, and each of these batteries is used in order.

However, to charge a plurality of batteries in a small space outdoors or while traveling, such as at a hotel room or in an outdoor broadcasting van, a plurality of known chargers have to be disposed two-dimensionally on a desk or floor because known battery chargers are structured in a manner such that batteries are attached to the battery attachment portions from above the case.

Therefore, the cases and the power cables of the battery chargers occupy a large space. In addition, since the power cables have to be drawn to the electrical outlets, it is difficult to line up the battery chargers, and the orientations and positions of the battery chargers cannot be aligned. Thus, as the number of required batteries increase, the operation of attaching and detaching the batteries to and from the battery chargers becomes more complicated and inefficient.

Accordingly, the assignee has proposed a battery charger that is advantageous for charging a plurality of batteries in a small space.

This battery charger includes battery storage chambers having a depth extending in a horizontal direction, openings that are formed on one of the ends of the battery storage chambers in the depth direction and through which batteries are attached to and detached from the battery storage chambers, and charger-side terminals provided in the battery storage chambers and that are connected to and disconnected from battery terminals provided on the batteries stored in the battery storage chambers. With this battery charger, the batteries are attached to and detached from the battery storage chambers in the horizontal direction, unlike other known battery chargers in which the battery is attached to and detached from the battery storage chamber from above.

When the capacity of the batteries is large, such as that of broadcasting equipment, a larger electric current flows between the battery terminals and the charger-side terminals. Therefore, the contact pressure of the battery terminals and the charger-side terminals is great. In addition, the number of battery terminals and charger-side terminals is great because, in addition to terminals for a charging current, terminals for communication and identification are provided. Therefore, in many cases, a great force is required to remove the battery terminals from the charger-side terminals.

Therefore, for a known battery charger in which batteries are attached to and detached from the battery storage chambers in a horizontal direction, instead of from above, it is difficult to remove the batteries from the charger. Therefore, there is a need for improvising the ease-of-use of the charger.

A battery charger according to an embodiment of the present invention has been conceived in light of the problems described above. Accordingly, a charger that allows batteries to be easily removed is provided.

A battery charger according to an embodiment of the present invention includes a battery storage chamber configured to accommodate the battery; an opening formed on a first end of the battery chamber in a depth direction, the battery being attached to and detached from the battery storage chamber through the opening; a charger-side terminal provided on the battery storage chamber, the charger-side terminal being connect to and disconnect from a battery-side terminal of the battery stored in the battery storage chamber; an attaching and detaching mechanism configured to prevent the battery from moving toward the opening while the battery is stored in the battery storage chamber and the battery-side terminal and the charger-side terminal are connected and to eject a second end of the battery in the depth direction from the opening by disconnecting the battery-side terminal and the charger-side terminal. The attaching and detaching mechanism includes: a push-operation member provided at the opening; a lock mechanism configured to prevent the battery from moving toward the opening by engaging with the battery while the battery-side terminal and the charger-side terminal are connected and to disengage from the battery when the push-operation member is pushed; a release member configured to move in conjunction with the pushing operation of the push-operation member, to engage with the battery so as to move the battery toward the opening, and to disconnect the battery-side terminal and the charger-side terminal; and an ejection spring configured to strike the battery so as to move the battery toward the opening and eject the battery through the opening while the battery-side terminal and the charger-side terminal are disconnected.

With the charge according to an embodiment of the present invention, by operating the push-operation member, the lock of the battery is released. Then, the battery-side terminal and the charger-side terminal are forcefully disconnected by the release member, and the battery is pushed toward the opening by the urging force of the ejection spring. Therefore, the end portion of the battery can be grasped, and the ease-of-operation of removing the battery is improved.

BRIEF DESCRIPTION OF THE DRAWINGS

FIG. 14A is a perspective view illustrating the terminal case with a cover at a closed position and FIG. 14B illustrates the terminal case with the cover removed and charger-side terminals exposed.

DESCRIPTION OF THE PREFERRED EMBODIMENTS

Embodiments of the present invention will be described below with reference to the drawings.

First Embodiment

First, before describing an attaching and detaching mechanism that is the main element of the embodiments of the present invention, the structure of a charger according to an embodiment of the present invention will be described.

Figure 1A:
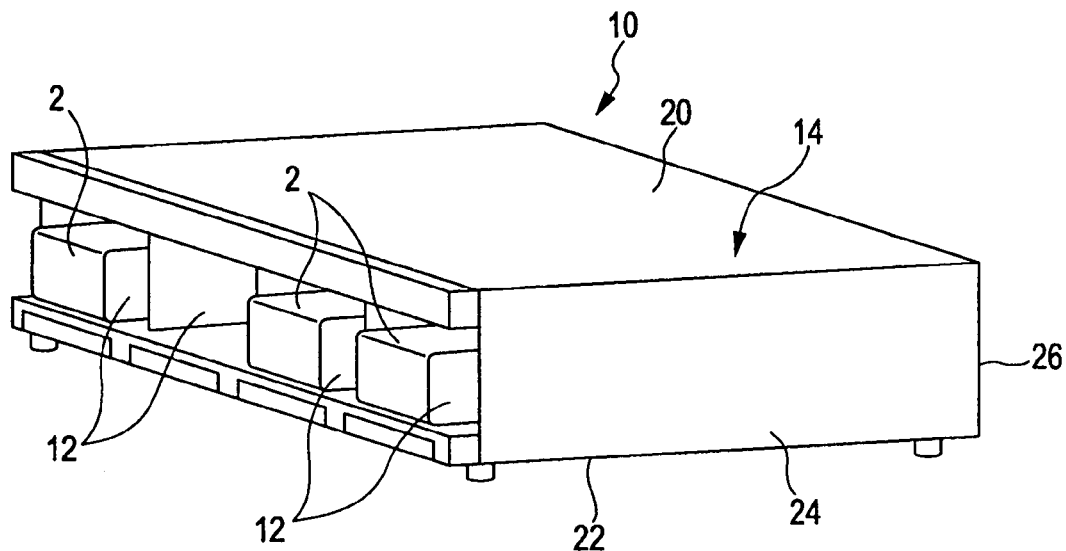
FIGS. 1A and 1B are perspective views illustrating batteries attached on a charger according to an embodiment of the present invention.
Figure 1B:
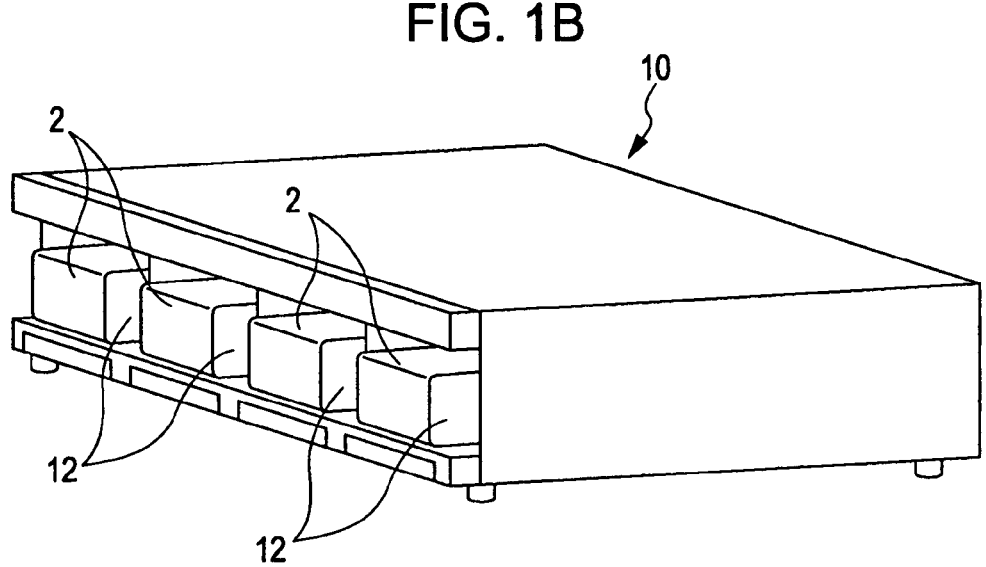

FIGS. 1A and 1B are perspective views illustrating batteries attached on a charger according to an embodiment of the present invention.

Figure 2:
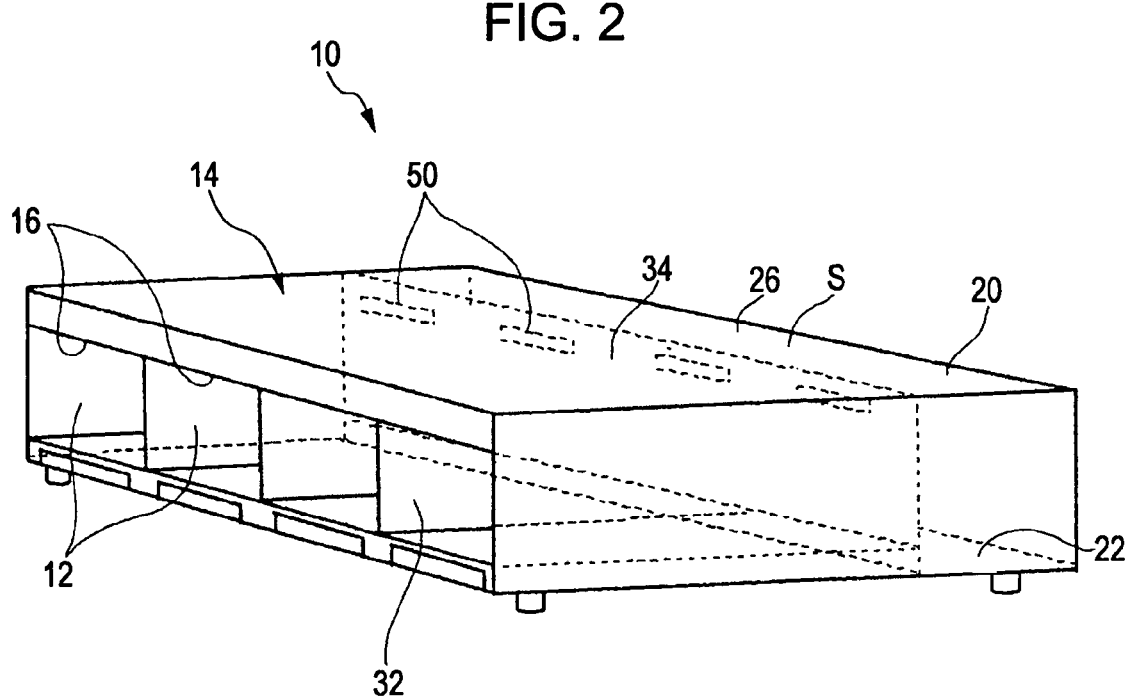
FIG. 2 is a perspective view illustrating the structure of the charger.
Figure 3:
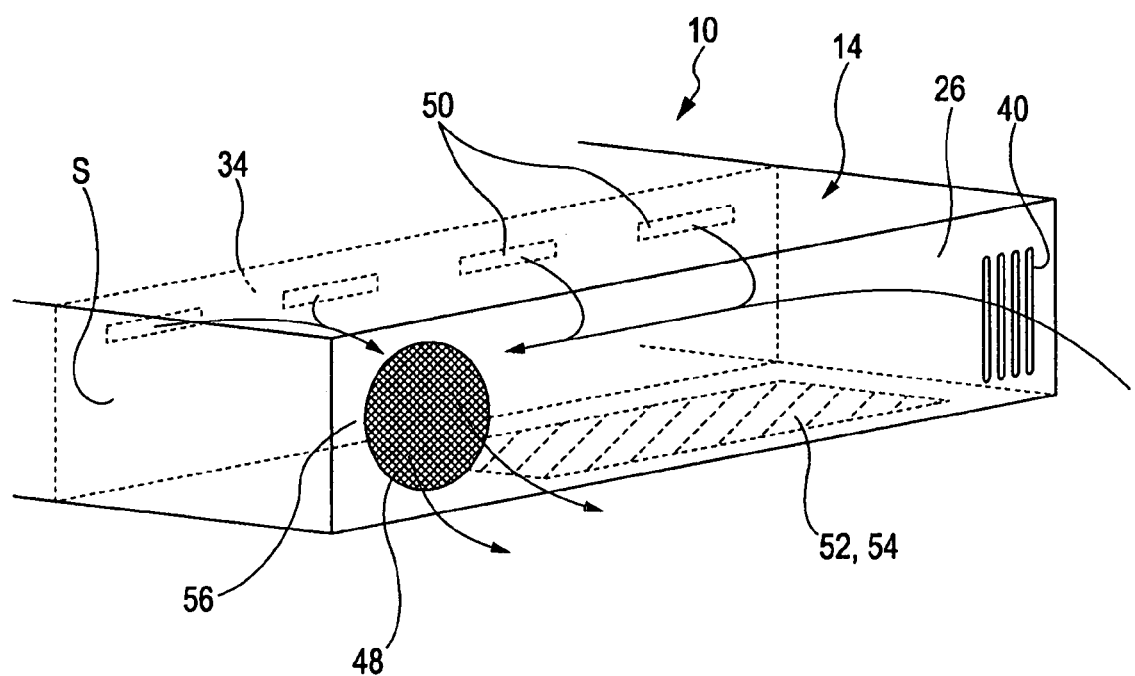
FIG. 3 illustrates the airflow in the charger.

FIG. 2 is a perspective view illustrating the structure of a charger 10. FIG. 3 illustrates the airflow in the charger 10.

Figure 4:
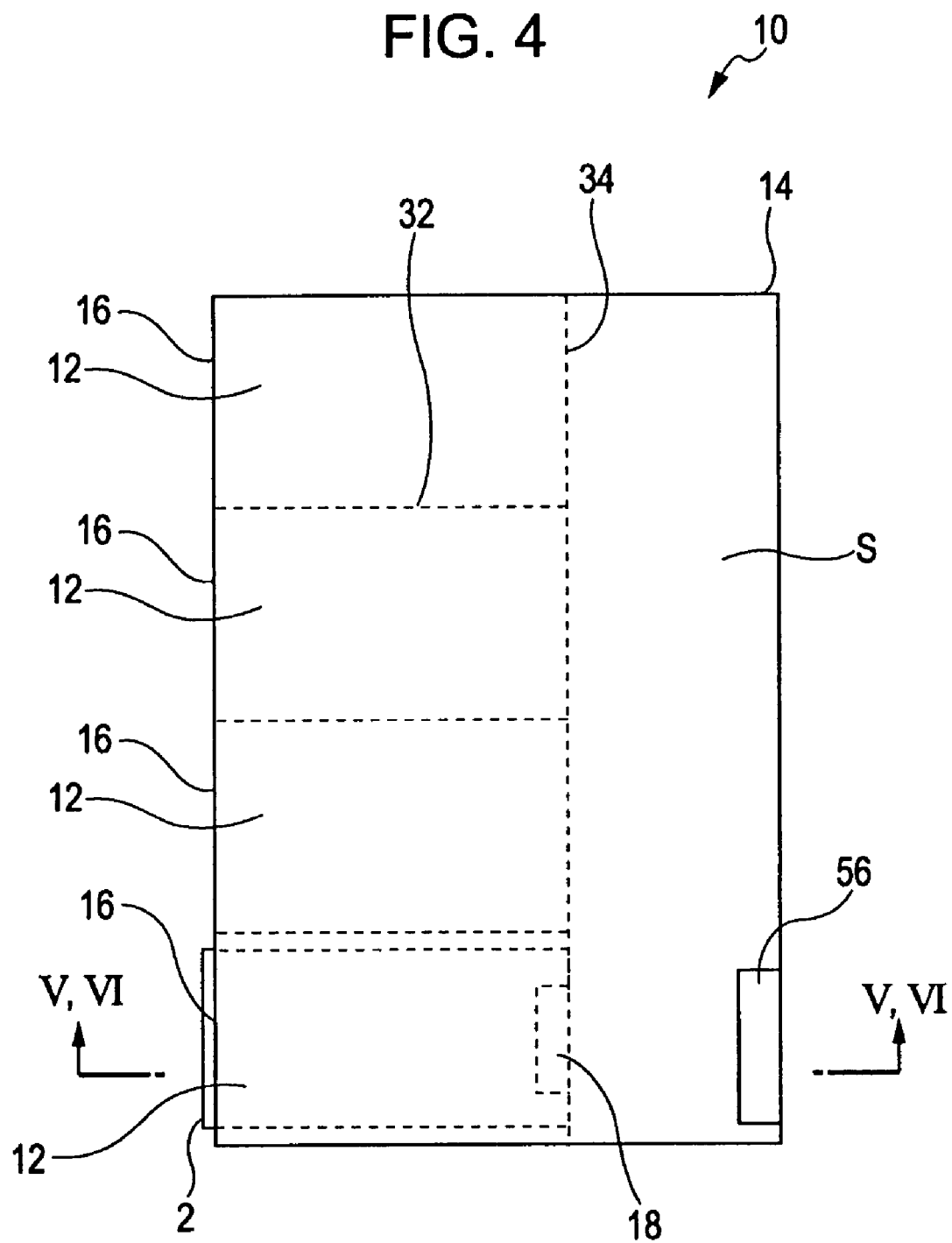
FIG. 4 is a plan view illustrating the charger.

FIG. 4 is a plan view of the charger 10.

Figure 5:
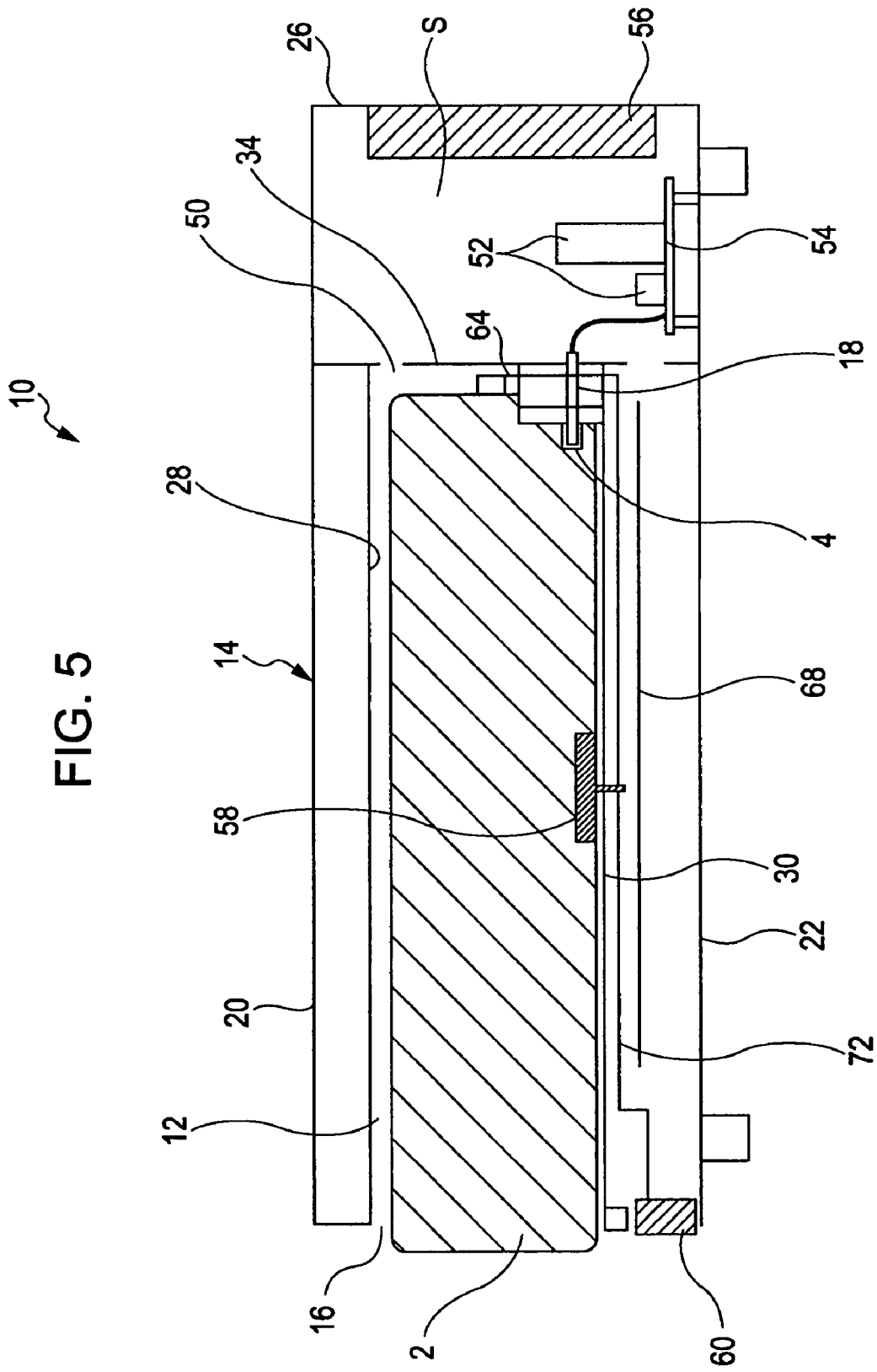
FIG. 5 is a cross-sectional view taken along line V-V in FIG. 4 and illustrates an attached state of a battery.
Figure 6:
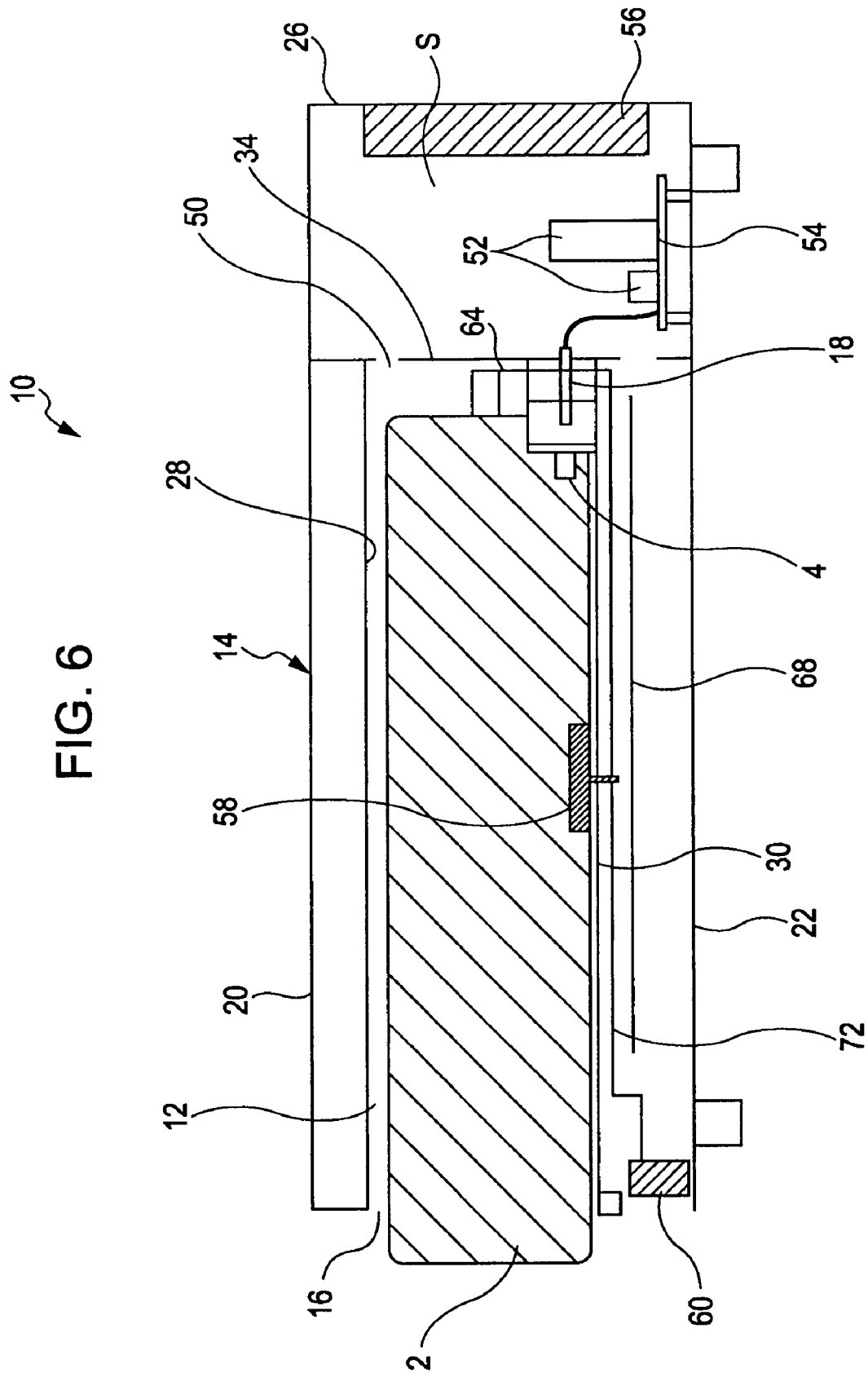
FIG. 6 is a cross-sectional view taken along line VI-VI in FIG. 4 and illustrates a disconnected state of a battery-side terminal and a charger-side terminal.

FIG. 5 is a cross-sectional view taken along line V-V in FIG. 4 and illustrates an attached state of a battery 2. FIG. 6 is a cross-sectional view taken along line VI-VI in FIG. 4 and illustrates a disconnected state of a battery-side terminal 4 and a charger-side terminal 18.

Figure 7:
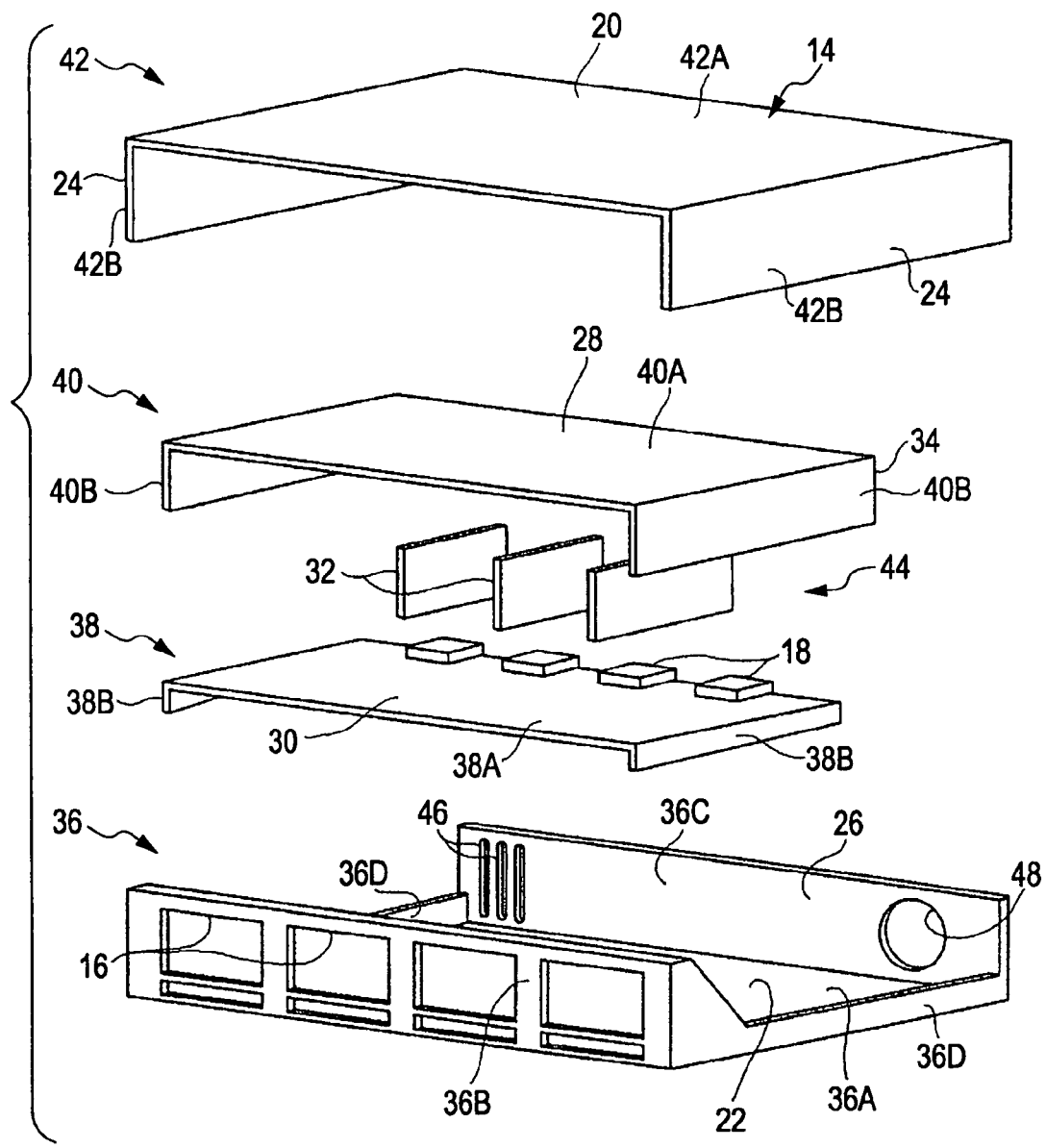
FIG. 7 is an exploded perspective view of a housing.
Figure 8:
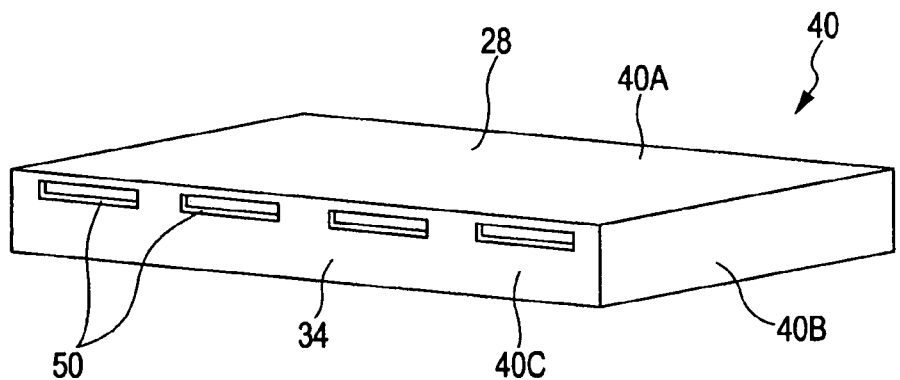
FIG. 8 is a perspective view from the backside of a second intermediate member.

FIG. 7 is an exploded perspective view of a housing 14. FIG. 8 is a perspective view from the backside of a second intermediate member 40.

As shown in FIGS. 1A, 1B, 5, and 6, the battery 2 is formed as a block whose width and height are each greater than its depth (length) and having a rectangular cross-section. The battery-side terminal 4 is provided on a first end of the battery 2 in the depth direction. The battery 2 is used for broadcasting equipment and, for example, has a large capacity capable of outputting electrical power of about 60 to 90 W. The battery 2 has a great size of, for example, a height of 6 cm, a width of 10 cm, a depth (length) of 17 cm.

The charger 10 charges a plurality of batteries 2 and includes the housing 14 including a plurality of battery storage chambers 12 that accommodate the batteries 2. According to this embodiment, four battery storage chambers 12 are provided. In FIG. 1A, three batteries 2 are stored in three of the four battery storage chambers 12. In FIG. 1B, batteries 2 are stored in all four of the battery storage chambers 12.

As shown in FIG. 2, each of the battery storage chambers 12 has width and height that are greater than the width and height, respectively, of each of the batteries 2. The battery storage chambers 12 are provided in the horizontal direction so that their sides in the depth direction (extending direction) extend parallel to each other.

As shown in FIGS. 2 and 5, at a second end of each battery storage chamber 12 in the depth direction, an opening 16 for attaching and detaching the battery 2 in the depth direction (length direction) of the battery storage chamber 12 is provided.

As shown in FIGS. 5 and 6, at a first end of the battery storage chamber 12 in the depth direction, the charger-side terminal 18 that can be connected to or disconnected from the battery-side terminal 4 of the battery 2 stored in the battery storage chamber 12 is provided.

According to this embodiment, a second end in the depth direction of the battery 2 stored in the battery storage chamber 12 with the battery-side terminal 4 and the charger-side terminal 18 connected is positioned in the vicinity of the opening 16.

As shown in FIG. 5, the battery storage chambers 12 are aligned in the horizontal direction so that the depth direction of the battery storage chambers 12 matches the horizontal direction. As shown in FIG. 2, the plurality of openings 16 is provided along a straight line in plan view of the housing 14.

As shown in FIG. 4, the housing 14 is a rectangle in plan view, and the openings 16 are aligned along one of the longer sides of the rectangle.

As shown in FIGS. 1A and 7, the housing 14 includes an upper plate 20 and a bottom plate 22 that are parallel to each other, left and right side plates 24 that are parallel to each other, and a backside plate 26 that is connected to the rear edges of the upper plate 20, the bottom plate 22, and the left and right side plates 24.

The battery storage chambers 12 are interposed between the left and right side plates 24 and between the upper plate 20 and the bottom plate 22 and are aligned in the horizontal direction.

As shown in FIGS. 5 and 6, each of the battery storage chambers 12 is defined by an upper wall 28 that is provided below the upper plate 20 and that partitions the upper area of the battery storage chamber 12, a bottom wall 30 that is provided above the bottom plate 22 and that partitions the lower area of the battery storage chamber 12, side walls 32 (refer to FIGS. 2, 4, and 7) that extend from the upper wall 28 to the bottom wall 30 and that partition the sides of adjacent battery storage chambers 12, and a rear wall 34 that is provided in front of the backside plate 26 and partitions the rear area of the battery storage chamber 12.

Each of the openings 16 is defined by the upper wall 28, the bottom wall 30, and the side walls 32.

As shown in FIG. 7, according to this embodiment, the housing 14 includes a lower member 36, a first intermediate member 38 disposed on the lower member 36, a second intermediate member 40 disposed on the first intermediate member 38, an upper member 42 disposed on the second intermediate member 40, and a plurality of partition walls 44 extending from the first intermediate member 38 to the second intermediate member 40.

The lower member 36 includes a bottom portion 36A constituting the bottom plate 22, a front portion 36B being vertically disposed at the front edge of the bottom portion 36A and having a plurality of openings 16, a back portion 36C constituting the backside plate 26, and left and right side portions 36D being vertically provided at the left and right edges of the bottom portion 36A.

Air inlets 46 provided as slits and a circular air outlet 48 are formed in the backside plate 26.

As shown in FIG. 7, the first intermediate member 38 includes a plate 38A constituting the bottom wall 30 of each of the battery storage chambers 12 and side plates 38B formed by bending downward the left and right edge areas of the plate 38A.

The first intermediate member 38 is attached to the lower member 36 by fitting the left and right side plates 38B to the inner sides of the side portions 36D or by fitting the left and right side plates 38B to the outer sides of the side portions 36D.

The charger-side terminals 18 are disposed at the rear edge of the bottom wall 30. The charger-side terminals 18 may be provided on the rear wall 34.

The second intermediate member 40 includes a plate 40A constituting the upper wall 28 of each battery storage chamber 12, side plates 40B formed by bending downward the left and right edge areas of the plate 40A, and a back plate 40C connecting the rear edge of the plate 40A and the rear edges of the side plates 40B and constituting the rear wall 34, as shown in FIG. 8.

Connecting parts 50 are formed as slits in the upper section of the rear wall 34.

The second intermediate member 40 is attached to the first intermediate member 38 by fitting the left and right side plates 40B to the outer sides of the side plates 38B, by fitting the left and right side plates 40B to inner sides of the side plates 38B, or by fitting the side plates 40B to the outer sides of the side plates 38B of the first intermediate member 38 that are fit to the outer sides of the side portions 36D of the lower member 36.

As shown in FIG. 7, the partition walls 44 extend from the plate 38A of the first intermediate member 38 to the plate 40A of the second intermediate member 40 and constitute the side walls 32 partitioning the sides of adjacent battery storage chambers 12.

The upper member 42 includes a plate 42A being disposed above the plate 40A of the second intermediate member 40 and constituting the upper plate 20 and side plates 42B being formed by bending downward the left and right edge areas of the plate 42A and constituting the left and right side plates 24.

The upper member 42 is attached to lower member 36 by fitting the left and right side plates 42B to the outer sides of the side portions 36D or by fitting the side plates 42B to the outer sides of the side plates 40B of the second intermediate member 40 that are fit to the outer sides of the side portions 36D of the lower member 36.

As shown in FIG. 2, a space S is defined by the upper plate 20, the bottom plate 22, the rear wall 34, and the backside plate 26.

The space S communicates with the battery storage chambers 12 through the connecting parts 50.

As shown in FIGS. 5 and 6, electronic parts 52 connected to the charger-side terminals 18 so as to constitute a charging circuit are disposed in the space S. According to this embodiment, the charging circuit is formed by mounting the electronic parts 52 on a printed circuit board disposed on the bottom plate 22. The charging circuit includes a power source unit that generates a charging voltage (charging current) to be supplied to the batteries 2 on the basis of a commercial power source supplied via a power cable (not shown) connected to an electrical outlet and a charging control unit that controls the supply of the charging voltage (charging current) to the batteries 2. The charging control unit, for example, turns on charging display lamps provided in the vicinity of the openings 16 of the battery storage chambers 12 during charging and turns off the charging display lamps when charging is complete.

As shown in FIG. 5, a fan 56 is provided in the air outlet 48. As shown by an arrow in FIG. 3, by driving the fan 56, outside air is introduced into the batteries 2 from the air inlets 46, and air in the battery storage chambers 12 is introduced into the space S through the connecting parts 50. The air introduced into the space S cools the electronic parts 52 and, then, is discharged outside the space S through the air outlet 48.

FIGS. 5 and 6 illustrate an attaching and detaching mechanism 58 that prevents the battery 2 from moving in the direction of the opening 16 while the battery 2 is stored in the battery storage chamber 12 and while the battery-side terminal 4 and the charger-side terminal 18 are connected. The attaching and detaching mechanism 58 also disconnects the battery-side terminal 4 and the charger-side terminal 18 and ejects the battery 2 from the second end in the longitudinal direction through the opening 16. FIGS. 5 and 6 also illustrate a push-operation member 60 provided at the opening 16.

The attaching and detaching mechanism 58 will be described in detail below.

Next, the usage of the charger 10 will be described.

To charge the battery 2, the battery 2 to be charged is inserted into the opening 16 from the first ends in the depth direction provided with the battery-side terminal 4; then the battery 2 is pushed farther into the battery storage chamber 12; and finally the battery-side terminal 4 is connected with the charger-side terminals 18.

When an electrical connection between the charger-side terminals 18 and the battery-side terminal 4 is detected, the charging control unit turns on the charging display lamp and starts supplying a charging voltage (charging current) to the battery 2. When charging is complete (i.e., at full charge), the supply of the charging voltage (charging current) to the battery 2 is stopped and the charging display lamp is turned off.

After the charging display lamp is turned off, the battery is pulled out from the battery storage chamber 12.

By configuring the charger 10 as described above, the following advantages are achieved.

Since a plurality of the battery storage chambers 12 are provided parallel to each other so that the depth direction of the battery storage chambers 12 matches the horizontal direction and the openings 16 are formed at the second end of the battery storage chambers 12 in the depth direction, a plurality of batteries 2 can be aligned in a small space and be charged, and the attachment and detachment operation of the batteries 2 can be carried out efficiently.

Figure 9:
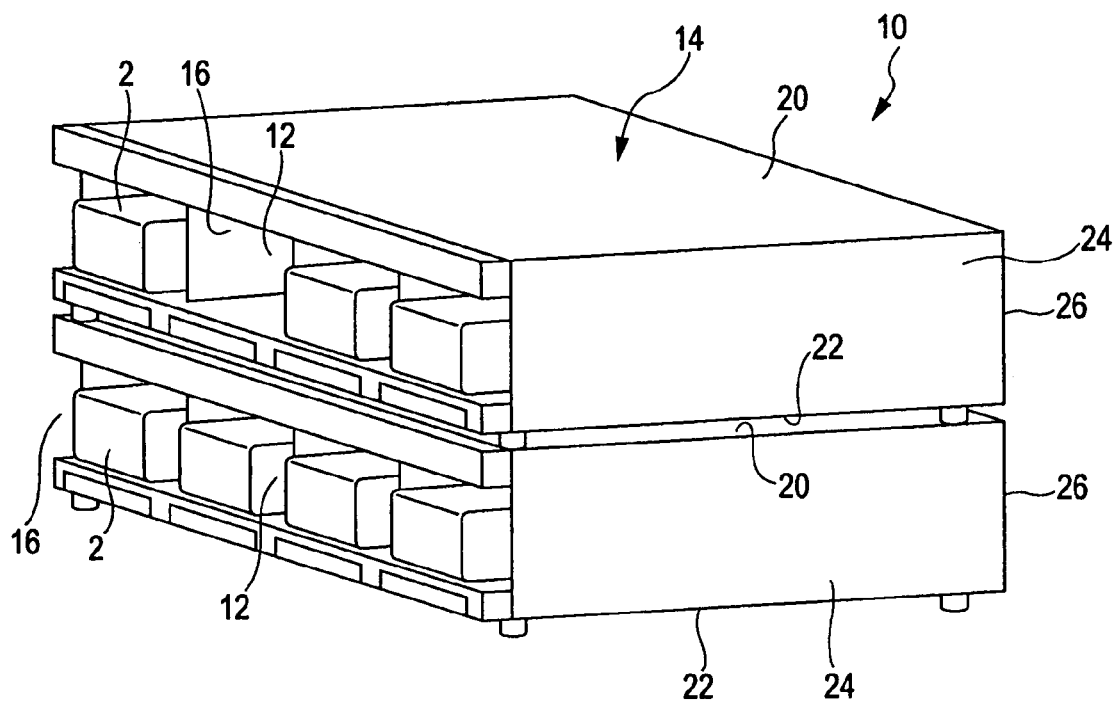
FIG. 9 is a perspective view illustrating a plurality of stacked chargers.

Since the battery storage chambers 12 are disposed so that the depth direction of the battery storage chambers 12 matches the horizontal direction and the openings 16 are formed along a straight line in plan view of the housing 14, as shown in FIG. 9, a plurality of chargers 10 can be stacked on each other by mounting a first charger 10 on a mounting surface on a desk or a shelf and then mounting a second charger 10 on the upper plate 20 of the first charger 10 in a manner such that the openings 16 of the first and second chargers 10 face the same direction.

By stacking the chargers 10 on each other in this way, a plurality of batteries 2 can be charged without occupying a large area on a mounting surface.

Thus, this is advantageous when charging many large-capacity batteries for broadcasting equipment in that the plurality of large-capacity batteries can be charged in a small space outdoors or while traveling, such as at a hotel room or in an outdoor broadcasting van.

Figure 10:
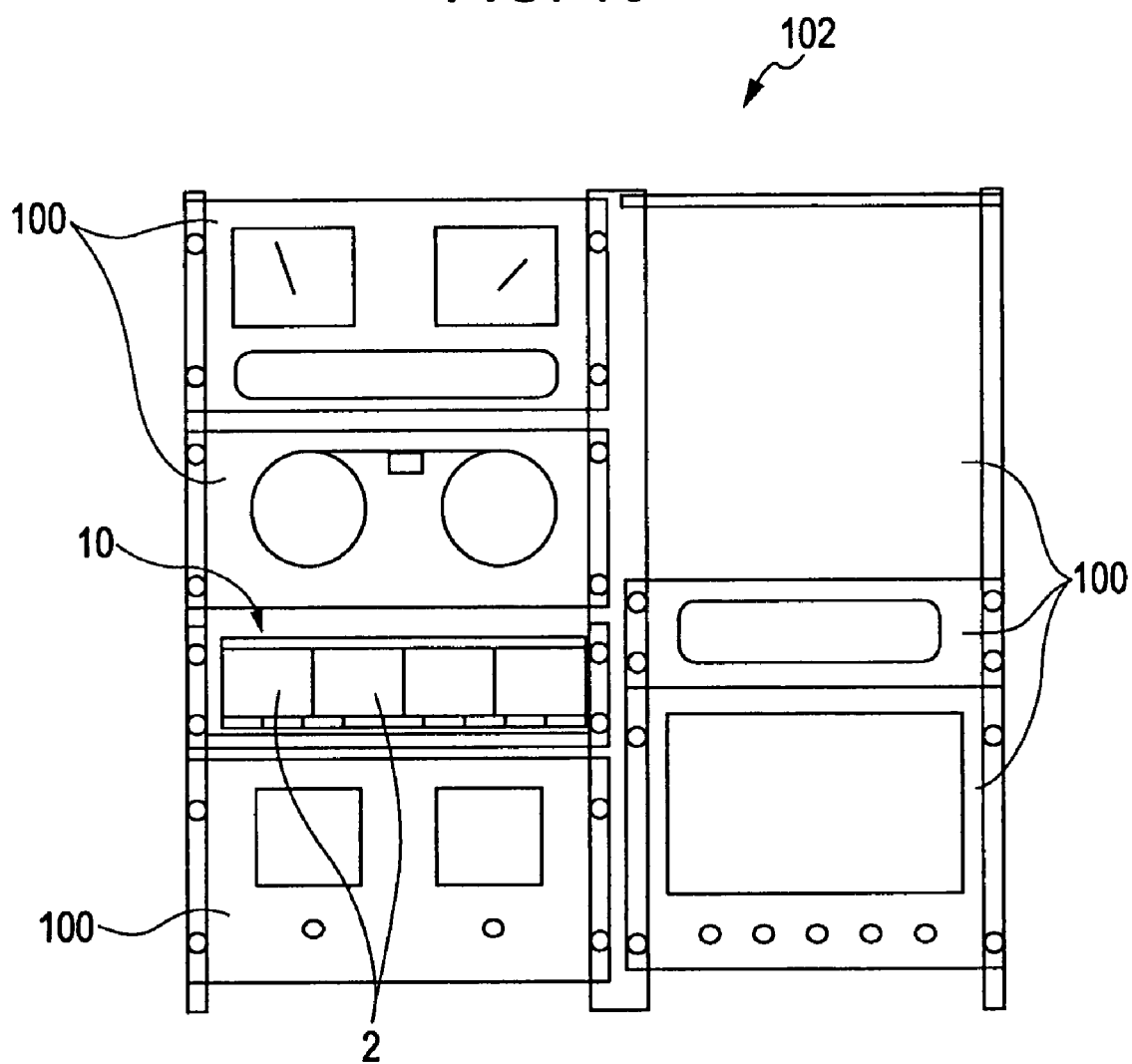
FIG. 10 illustrates a charger stored in a standard rack for broadcasting equipment.

As shown in FIG. 10, broadcasting equipment 100 installed in a broadcasting station or an outdoor broadcasting van is often stored in a standard rack for broadcasting equipment.

Such standard racks for broadcasting equipment have a standardized width, e.g., 19 inches, for accommodating the broadcasting equipment 100. The width of the broadcasting equipment 100 is set so that the broadcasting equipment 100 can be stored in 19-inch rack 102, which is one type of such a standard rack for broadcasting equipment.

Therefore, by setting the width of the housing 14 of the charger 10 to 19 inches so as to match the 19-inch rack 102, the charger 10 can be easily stored in the 19-inch rack 102. Moreover, the chargers 10 can be stacked on each other and stored in the 19-inch rack 102. The plurality of large-capacity batteries 2 for broadcasting equipment can be aligned and charged in a small space in an outdoor broadcasting van and so on. Therefore, this is particularly advantageous when charging the batteries 2 outdoors or while traveling, such as at a hotel room or in an outdoor broadcasting van.

The space S is provided adjacent to the battery storage chambers 12 in the housing 14, and the electronic parts 52 constituting a charging circuit are disposed in the space S.

By disposing the charging circuit for charging the batteries 2 mostly inside the space S, the size of the housing 14 can be reduced. In other words, this is advantageous in reducing the size of the charger 10.

Furthermore, by disposing the charging circuit for charging the batteries 2 mostly inside the space S, only one of each of an electricity-receiving connector and a power cable are required. This is advantageous in aligning many batteries 2 for charging in a small space.

The space S is provided adjacent to the battery storage chambers 12 in the housing 14. The electronic parts 52 constituting the charging circuit are disposed in the space S. The space S is cooled through the air inlets 46, the air outlet 48, and the fan 56.

Therefore, although heat is generated at the electronic parts 52 constituting the charging circuit when charging is carried out, the electronic parts 52 are cooled by outside air introduced through the air inlets 46 and air inside the battery storage chambers 12 introduced through the connecting parts 50. This is advantageous in protecting the electronic parts 52.

The space S where the electronic parts 52 are disposed is defined by the upper plate 20, the bottom plate 22, the rear wall 34, and the backside plate 26 and is separated from the battery storage chambers 12. Therefore, heat generated at the electronic parts 52 can be prevented from being transmitted to the batteries 2 in the battery storage chambers 12. This is advantageous in protecting the batteries 2.

Furthermore, although heat is generated at the batteries 2 when carrying out charging, the batteries 2 can be cooled because air flows from the openings 16 to the connecting parts 50. This is advantageous in protecting the batteries 2.

Next, the attaching and detaching mechanism 58 that constitutes the main element according to this embodiment of the present invention will be described in detail.

Figure 11:
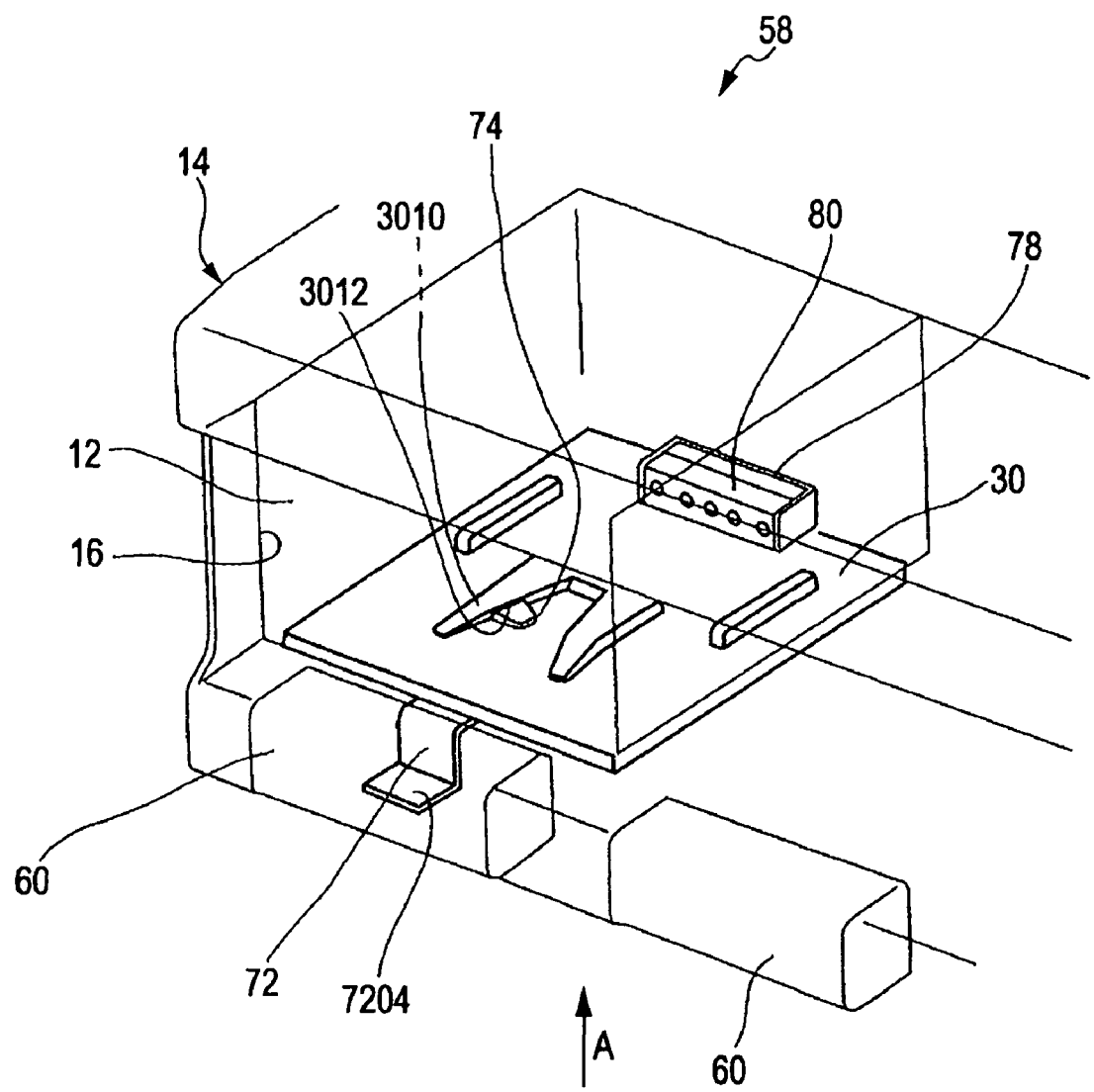
FIG. 11 is a perspective view illustrating the overall structure of an attaching and detaching mechanism.
Figure 12:
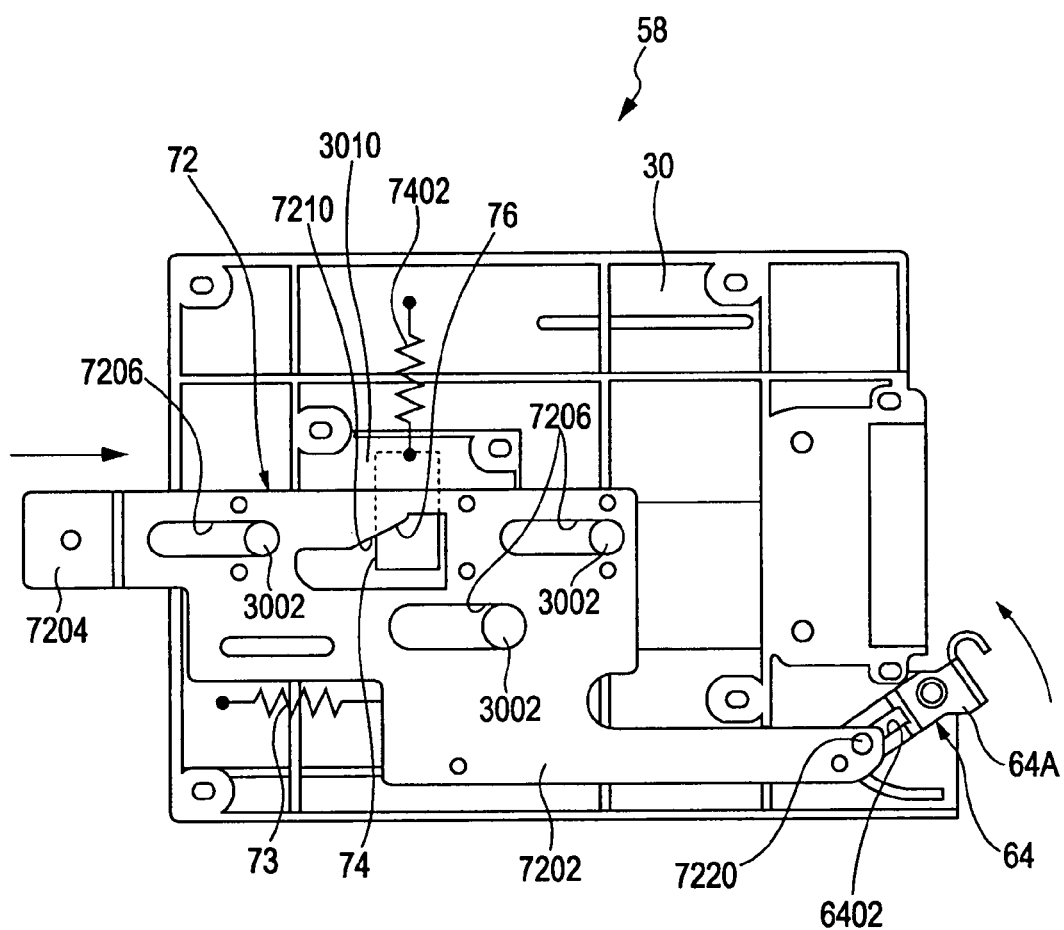
FIG. 12 illustrates the attaching and detaching mechanism viewed from the arrow A in FIG. 11.
Figure 13:
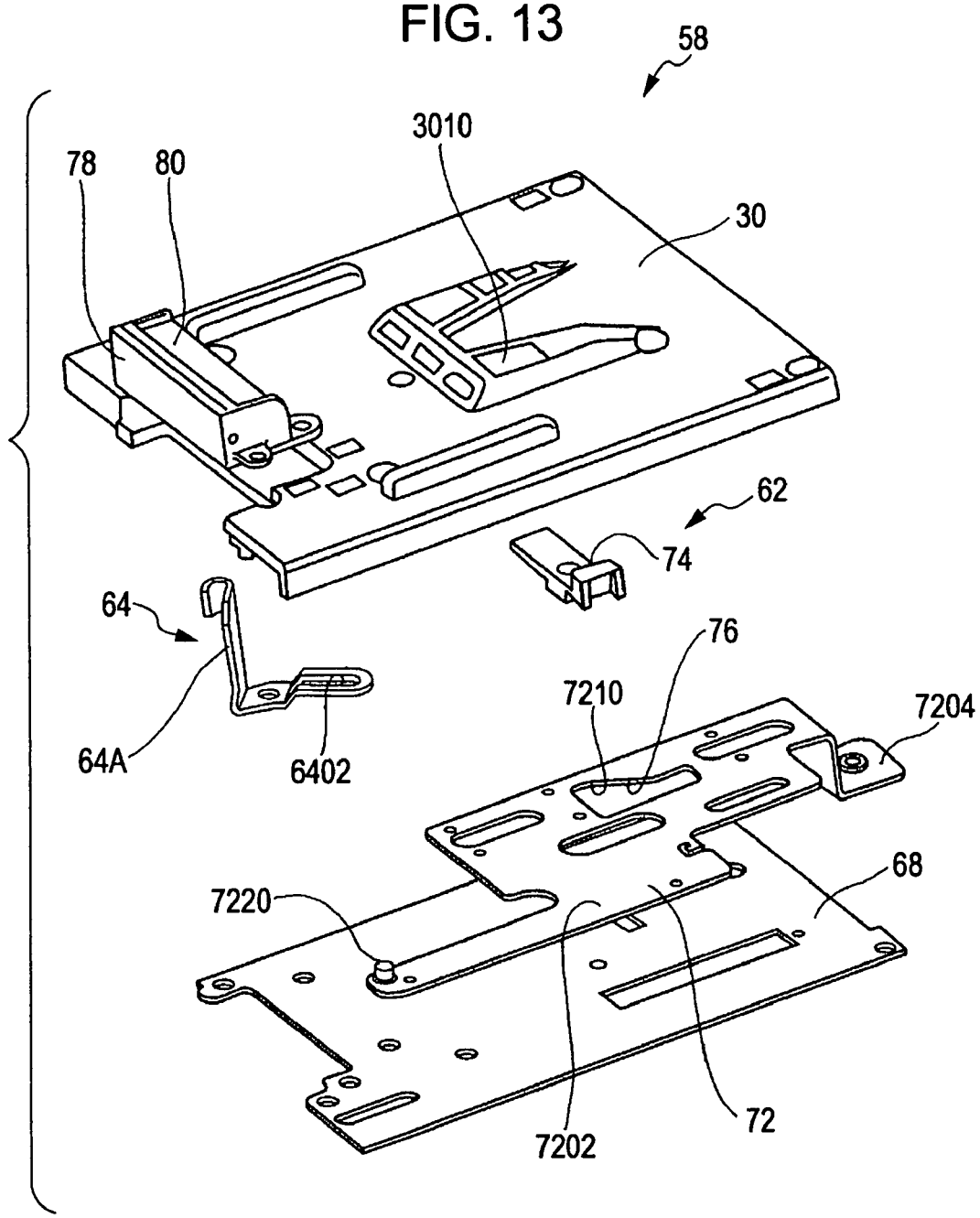
FIG. 13 illustrates an exploded perspective view of the attaching and detaching mechanism.
Figure 14A:
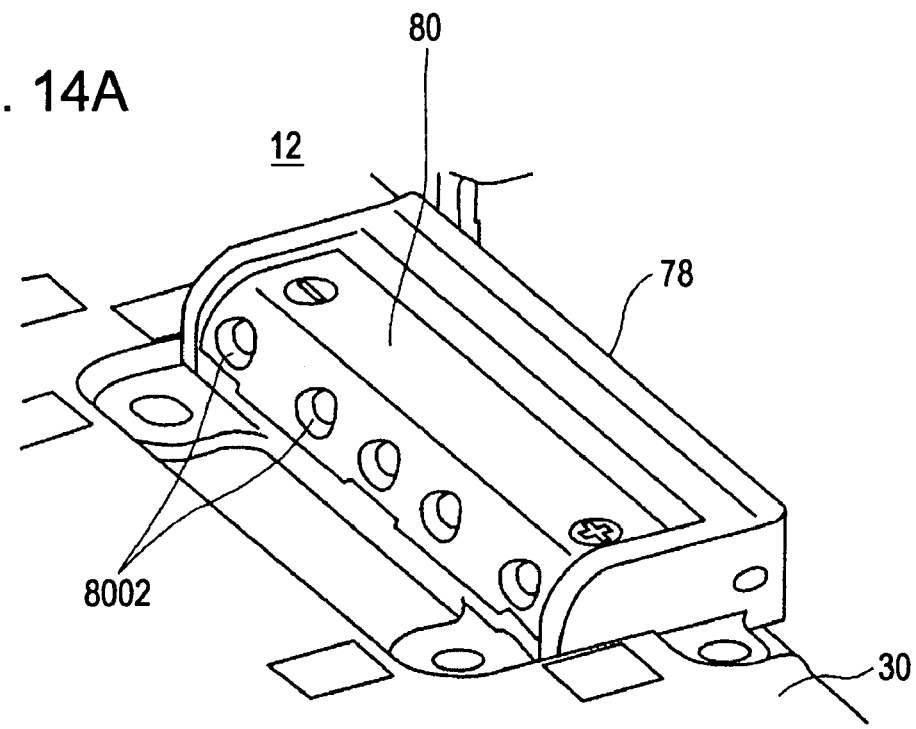
FIGS. 14A and 14B illustrate a terminal case, where
Figure 14B:
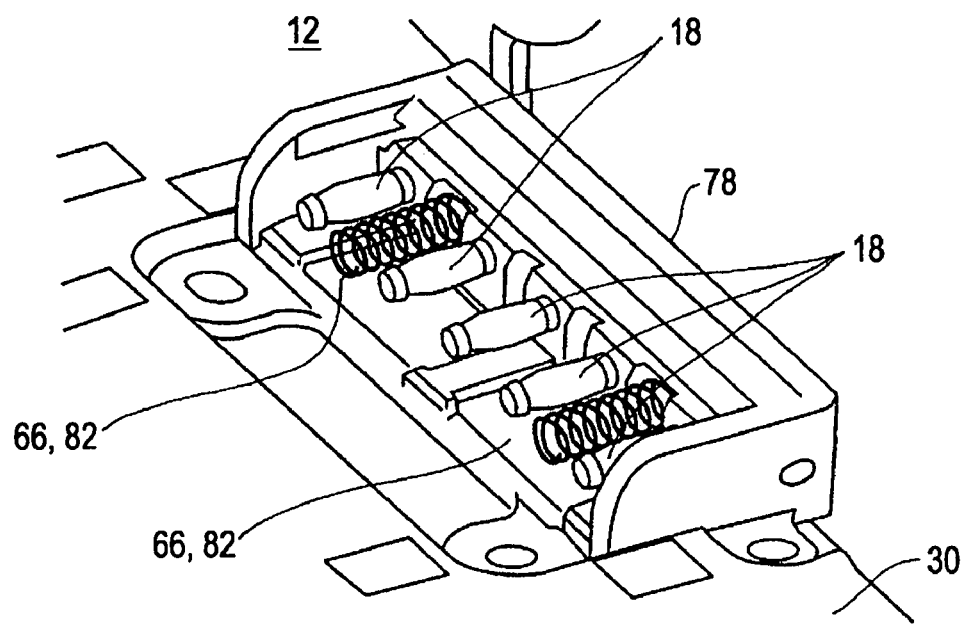

FIG. 11 is a perspective view illustrating the overall structure of the attaching and detaching mechanism 58. FIG. 12 illustrates the attaching and detaching mechanism 58 viewed from the arrow A in FIG. 11. FIG. 13 illustrates an exploded perspective view of the attaching and detaching mechanism 58. FIG. 14A is a perspective view illustrating a terminal case 78 with a cover 80 at a closed position. FIG. 14B illustrates the terminal case 78 with the cover 80 removed and the charger-side terminals 18 exposed.

As shown in FIG. 11, a plurality of attaching and detaching mechanisms 58 corresponding to the battery storage chambers 12 is provided.

Each of the attaching and detaching mechanisms 58 prevents each of the batteries 2 from moving in the direction of the openings 16 while the batteries 2 are stored in the battery storage chambers 12 and while the battery-side terminals 4 (refer to FIGS. 5 and 6) and the charger-side terminals 18 (refer to FIG. 14B) are connected. Each of attaching and detaching mechanism 58 also disconnects each of the battery-side terminals 4 and each of the charger-side terminals 18 and ejects each of the batteries 2 from the second end in the depth direction through the openings 16.

As shown in FIG. 13, the attaching and detaching mechanism 58 includes the push-operation member 60 (refer to FIG. 11), a lock mechanism 62, a release member 64, and an ejection spring 66 (refer to FIG. 14B).

As shown in FIG. 11, the push-operation member 60 is provided at the opening 16. As shown in FIGS. 5 and 6, according to this embodiment, the push-operation member 60 is movably disposed in the space between the bottom plate 22 and the bottom wall 30 below the opening 16 and is disposed at the front area of the housing 14.

According to this embodiment, in the depth direction of the battery storage chamber 12, the area where the opening 16 is formed is the front area, whereas the area where the charger-side terminal 18 is provided is the rear area. In other words, the depth direction of the battery storage chamber 12 corresponds to the front to back direction of the battery storage chamber 12.

Each of the lock mechanism 62 is latched to each of the battery 2 to prevent the battery 2 from moving in the direction of the openings 16 of the battery 2 while the battery-side terminal 4 and the charger-side terminal 18 are connected. The lock mechanism 62 is released from the battery when the push-operation member 60 is pushed.

As shown in FIG. 13, the lock mechanism 62 includes a sliding member 72, a locking claw 74, and a cam portion 76.

The sliding member 72 extends in the depth direction of the battery storage chamber 12 and slides in the depth direction of the battery storage chamber 12 when the push-operation member 60 is pushed.

According to this embodiment, as shown in FIG. 13, the sliding member 72 includes a main body 7202 disposed on a surface of the bottom wall 30 facing the bottom plate 22 with a base plate 68 interposed between the main body 7202 and the bottom wall 30 and a bent piece 7204 bent downward from the front edge area of the main body 7202. The base plate 68 is attached to the bottom wall 30.

As shown in FIG. 12, a plurality of long holes 7206 extending in the extending direction of the main body 7202, i.e., the front to back direction, are formed in the main body 7202. Pins 3002 protruding from the bottom wall 30 engage with the long holes 7206. In this way, the sliding member 72 is supported in a manner movable in the front to back direction.

A spring 73 is stretched between the main body 7202 and the bottom wall 30. The sliding member 72 is constantly urged toward the opening 16 by the spring 73. The pins 3002 come into contact with the edge of the long holes 7206, determining the limit position of the sliding member 72 in the forward direction.

As shown in FIG. 11, the push-operation member 60 is attached to the bent piece 7204. Thus, when the push-operation member 60 is pushed, the sliding member 72 slides in the back direction.

As shown in FIGS. 11 and 13, the locking claw 74 is supported on a storing portion 3010 protruding upward from the bottom wall 30 in a manner movable in a direction orthogonal to the sliding direction of the sliding member 72. As shown in FIG. 12, the locking claw 74 is urged by a spring 7402 in a direction such that the locking claw 74 is latched to a battery-side latching portion (not shown) provided on the batteries 2. The spring 7402 may be an extension spring, as shown in FIG. 12. However, by reversing the position, the spring 7402 may be a compression spring.

The storing portion 3010 has a downward opening. Thus, the upper surface and the left and right side walls of the locking claw 74 is supported on the side wall of the storing portion 3010, and the lower surface of the locking claw 74 is supported by a portion of the sliding member 72 provided at the lower portion of the storing portion 3010.

As shown in FIG. 11, an opening 3012 is formed at the edge of the storing portion 3010 in the movement direction of the locking claw 74. The tip of the locking claw 74 is exposed through the opening 3012.

As shown in FIG. 13, the cam portion 76 engages with the locking claw 74 when the sliding member 72 is moved by pushing the push-operation member 60 and moves the locking claw 74 in a direction of releasing the battery-side latching portion. According to this embodiment, the cam portion 76 is constituted of an edge 7210 of an opening formed in the main body 7202 of the sliding member 72.

As shown in FIGS. 12 and 13, the release member 64 forcefully releases the battery-side terminal 4 from the charger-side terminal 18 by moving in conjunction with the pushing operation of the push-operation member 60, engaging with the first of the battery 2 in the depth direction, and moving the battery 2 toward the opening 16.

According to this embodiment, the release member 64 includes a release lever 64A slidably supported on the bottom wall 30.

The release lever 64A is connected to the sliding member 72 and slides when the sliding member 72 slides in conjunction with the pushing operation of the push-operation member 60. The release lever 64A comes into contact with the first of the battery 2 in the depth direction after the locking claw 74 is disconnected from the battery-side latching portion so as to release the battery-side terminal 4 from the charger-side terminals 18 by moving the battery 2 toward the opening 16.

According to this embodiment, the connection between the release lever 64A and the sliding member 72 is established by a pin 7220 provided on the sliding member 72 engaging with a long groove 6402 provided in the release lever 64A.

The ejection spring 66 is stroke against the first end of the battery in the depth direction and causes the other end of the battery 2 in the depth direction to be ejected from the opening 16 by moving the battery 2 toward the opening 16 while the battery-side terminal 4 is disconnected from the charger-side terminals 18.

As shown in FIG. 14A, according to this embodiment, the terminal case 78 is provided on the second end of the battery storage chamber 12 in the depth direction.

As shown in FIG. 14B, the terminal case 78 is open toward the opening 16, and a plurality of charger-side terminals 18 is provided inside the terminal case 78. The charger-side terminals 18 extend in the depth direction of the battery storage chamber 12 and are provided adjacent to each other in the horizontal direction.

According to this embodiment, five charger-side terminals 18 are provided. Two of the five charger-side terminals 18 constitute a positive terminal and a negative terminal for supplying a charging current to the battery 2; two other charger-side terminals 18 constitute communication terminals for enabling the charge control circuit to carry out data communication with a communication unit embedded in the battery 2; and the remaining charger-side terminal 18 constitutes an identification terminal for identifying the type of the battery 2 by the charging control circuit.

As shown in FIGS. 14A and 14B, the cover 80 is provided on the terminal case 78. The cover 80 is movable between a closed position where the cover 80 covers the front and upper areas of the plurality of the charger-side terminals 18 and an open position where the cover 80 is moved from the closed position away from the opening 16 in the depth direction of the battery storage chamber 12 so as to expose the plurality of the charger-side terminals 18.

Hole 8002 are formed in surface of the cover 80 facing the front of the plurality of the charger-side terminals 18 (i.e., positions on the cover 80 in the depth direction of the battery storage chamber 12 facing the plurality of the charger-side terminals 18 when the cover 80 is at the closed position). The charger-side terminals 18 pass through the holes 8002 when the cover 80 moves from the closed position to the open position.

Two cover springs 82 that urge the cover 80 in the closed position are provided on the terminal case 78.

According to this embodiment, the ejection spring 66 constitute the cover springs 82.

Next, the operation of the attaching and detaching mechanisms 58 will be described.

To install each of the batteries 2, the battery 2 is inserted into the opening 16 of the charger 10 from the first end of the battery 2 in the depth direction, i.e., the end provided with the battery-side terminal 4, and is pushed farther into the battery storage chamber 12.

Then, the first end of the battery 2 in the depth direction comes into contact with cover 80 and moves the cover 80 backward against the urging force of the ejection spring 66.

The displacement of the battery 2 causes the charger-side terminals 18 to be inserted into the battery-side terminals 4. Then, finally, the charger-side terminals 18 are fully connected with the battery-side terminals 4. In this way, an urging force is built up in the ejection spring 66, and the cover 80 is at a closed position.

When the battery 2 is inserted, the locking claw 74 comes into contact with part of the battery 2 and is first pushed down. Then, when the charger-side terminals 18 and the battery-side terminals 4 are fully connected, the locking claw 74 protrudes and engages with the battery-side latching portion. In this way, the battery 2 is locked, and its movement toward the opening 16 is prevented.

When the battery 2 is installed, the push-operation member 60, the sliding member 72, and the release lever 64A do not move.

To remove the battery 2, the push-operation member 60 is pushed farther into the battery storage chamber 12 against the urging force of the spring 73.

Then, the sliding member 72 moves backward in conjunction with the operation of the push-operation member 60; the cam portion 76 pushes the locking claw 74 down into the opening 3012; the locking claw 74 and the battery-side latching portion are disengaged; and the lock of the battery 2 is released.

At the same time the sliding member 72 starts moving backward in conjunction with the operation of the push-operation member 60, the release member 64 slides. Then, after the locking claw 74 and the battery-side latching portion are disengaged, the release lever 64A comes into contact with the first end of the battery 2 in the depth direction so as to move the battery 2 toward the opening 16. The operation force of the push-operation member 60 forces the charger-side terminals 18 and the battery-side terminals 4 to be disengaged.

The cover 80 contacts the end surface of the battery 2 by the urging force built up in the ejection spring 66. The urging force of the ejection spring 66 does not cause the charger-side terminals 18 and the battery-side terminals 4 to disengage. However, when the charger-side terminals 18 and the battery-side terminals 4 are disengaged, the urging force of the ejection spring 66 causes the battery 2 to be pushed through the opening 16 because the urging force causes the cover 80 to push the end surface of the battery 2 toward the opening 16.

In this way, the second end of the battery 2 that is the opposite end of the first end provided with the battery-side terminals 4 is ejected from the opening 16. Accordingly, the second end of the battery 2 ejected from the opening 16 can be held. By holding the ejected second end, the battery 2 can be removed from the battery storage chambers 12.

According to this embodiment, by operating the push-operation member 60, the charger-side terminals 18 and the battery-side terminals 4 are forcefully disengaged by the release lever 64A after the lock of the battery 2 is released, and then, the battery 2 is pushed toward the opening 16 by the urging force of the ejection spring 66. Therefore, the end of the battery 2 can be grasped, and the ease-of-operation of removing the battery 2 is improved.

In particular, as in this embodiment, when the battery 2 is a large capacity battery for broadcasting equipment can is attached to and detached from the broadcasting equipment, a great electric current is supplied between the charger-side terminals 18 and the battery-side terminals 4. Accordingly, the contact pressure between the charger-side terminals 18 and the battery-side terminals 4 is great, and a great number of charger-side terminals 18 and five battery-side terminals 4, i.e., five each, are supplied. Therefore, a great force is required to disengage the charger-side terminals 18 and the battery-side terminals 4. Unlike this embodiment, if the charger-side terminals 18 and the battery-side terminals 4 are disengaged using only the ejection spring 66 and without using the release lever 64A and the end of the battery 2 is ejected, the ejection spring 66 must generate a great urging force. In such a case, the wire diameter and the winding diameter of the ejection spring 66 becomes great, causing a disadvantage in reducing the size of the charger 10.

In contrast, according to this embodiment, the charger-side terminals 18 and the battery-side terminals 4 are forcefully disengaged using the force of pushing the push-operation member 60 via the release lever 64A, and then the end of the battery 2 is ejected by the urging force of the ejection spring 66. Therefore, only a small wire diameter and winding diameter is required for the ejection spring 66. Accordingly, the size of the charger 10 can be reduced.

According to this embodiment, the lock mechanism 62 includes the sliding member 72, the locking claw 74, and the cam portion 76. The lock mechanism 62 is satisfactory so long as it prevents the battery 2 from moving toward the opening 16 by engaging with the battery while the charger-side terminals 18 and the battery-side terminals are connected and releases the battery 2 when the push-operation member 60 is pushed. Therefore, the lock mechanism 62 is not limited that according to this embodiment, and other lock mechanism having various known structures may be employed. However, by employing the structure according to this embodiment, the number of components included in the lock mechanism 62 can be reduced, and this is advantageous in reducing the size of the charger 10.

According to this embodiment, the push-operation member 60 is pushed backward in the depth direction of the battery storage chamber 12. However, by providing a linking mechanism between the push-operation member 60 and the sliding member 72, the push-operation member 60 may instead be pushed leftward or rightward.

According to this embodiment, the release member 64 is constituted of the release lever 64A. However, for example, a rod may be connected to the sliding member 72 via a linking mechanism, and the charger-side terminals 18 and the battery-side terminals 4 may be forcefully disengaged by moving the rod linearly backward by moving the sliding member 72 forward, and moving the battery 2 by the rod.

According to this embodiment, the battery 2 is shaped as a rectangular column whose depth is greater than its width and height. However, the shape of the battery 2 is not limited thereto. The shape of the battery storage chambers 12 is determined on the basis of the shape of the battery 2. The scope of the present invention includes a case in which the battery has a depth smaller than its width or height.

It should be understood by those skilled in the art that various modifications, combinations, sub-combinations and alterations may occur depending on design requirements and other factors insofar as they are within the scope of the appended claims or the equivalents thereof.

What is claimed is:

1. A charger configured to charge a battery, the charger comprising:

a fan member that introduces air into the charger;

a battery storage chamber configured to accommodate the battery;

an opening formed on a first end of the battery chamber in a depth direction, the battery being attached to and detached from the battery storage chamber through the opening;

a charger-side terminal provided on the battery storage chamber, the charger-side terminal being connected to and disconnected from a battery-side terminal of the battery stored in the battery storage chamber; and an attaching and detaching mechanism configured to prevent the battery from moving toward the opening while the battery is stored in the battery storage chamber and the battery-side terminal and the charger-side terminal are connected and to eject a second end of the battery in the depth direction from the opening by disconnecting the battery-side terminal and the charger-side terminal, wherein the attaching and detaching mechanism includes a push-operation member provided at the opening, a lock mechanism configured to prevent the battery from moving toward the opening by engaging with the battery while the battery-side terminal and the charger-side terminal are connected and to disengage from the battery when the push-operation member is pushed, a release member configured to move in conjunction with the pushing operation of the push-operation member, to engage with the battery so as to move the battery toward the opening, and to disconnect the battery-side terminal and the charger-side terminal, and an ejection spring configured to strike the battery so as to move the battery toward the opening and eject the battery through the opening while the battery-side terminal and the charger-side terminal are disconnected.

2. A charger configured to charge a battery, the charger comprising:

a battery storage chamber configured to accommodate the battery;

an opening formed on a first end of the battery chamber in a depth direction, the battery being attached to and detached from the battery storage chamber through the opening;

a charger-side terminal provided on the battery storage chamber, the charger-side terminal being connected to and disconnected from a battery-side terminal of the battery stored in the battery storage chamber; and an attaching and detaching mechanism configured to prevent the battery from moving toward the opening while the battery is stored in the battery storage chamber and the battery-side terminal and the charger-side terminal are connected and to eject a second end of the battery in the depth direction from the opening by disconnecting the battery-side terminal and the charger-side terminal, wherein the attaching and detaching mechanism includes
a push-operation member provided at the opening,
a lock mechanism configured to prevent the batten from moving toward the opening by engaging with the battery while the battery-side terminal and the charger-side terminal are connected and to disengage from the battery when the push-operation member is pushed, a release member configured to move in conjunction with the pushing operation of the push-operation member, to engage with the battery so as to move the battery toward the opening, and to disconnect the battery-side terminal and the charger-side terminal, and an ejection spring configured to strike the battery so as to move the battery toward the opening and eject the battery through the opening while the battery-side terminal and the charger-side terminal are disconnected, and wherein the lock mechanism includes:
a sliding member extending in the depth direction of the battery storage chamber and being configured to slide in the depth direction when the push-operation member is pushed, a locking claw movably supported on a wall portion of the battery storage chamber in a direction intersecting with a sliding direction of the sliding member, being latchable to the battery-side latching portion provided on the battery, and being urged in a direction of latching the locking claw to the battery-side latching portion, and a cam portion provided on the sliding member and configured to engage with the locking claw so as to move the locking claw in a direction of releasing the locking claw from the battery-side latching portion when the sliding member moves by pushing the push-operation member.

3. The charger according to claim 2,
wherein the release member includes a release lever slidably supported on the wall portion of the battery storage chamber, and wherein the release lever is connected to the sliding member, slides when the sliding member slides by pushing the push-operation member, moves the battery toward the opening after the locking claw is released from the battery-side latching portion, and disconnects the battery-side terminal and the charger-side terminal.

4. A charger configured to charge a battery, the charger comprising:

a battery storage chamber configured to accommodate the battery;

an opening formed on a first end of the battery chamber in a depth direction, the battery being attached to and detached from the battery storage chamber through the opening;

a charger-side terminal provided on the battery storage chamber, the charger-side terminal being connected to and disconnected from a battery-side terminal of the battery stored in the battery storage chamber;

an attaching and detaching mechanism configured to prevent the battery from moving toward the opening while the battery is stored in the battery storage chamber and the battery-side terminal and the charger-side terminal are connected and to eject a second end of the battery in the depth direction from the opening by disconnecting the battery-side terminal and the charger-side terminal, wherein the attaching and detaching mechanism includes
a push-operation member provided at the opening,
a lock mechanism configured to prevent the battery from moving toward the opening by engaging with the battery while the battery-side terminal and the charger-side terminal are connected and to disengage from the battery when the push-operation member is pushed, a release member configured to move in conjunction with the pushing operation of the push-operation member, to engage with the battery so as to move the battery toward the opening, and to disconnect the battery-side terminal and the charger-side terminal, and an ejection spring configured to strike the battery so as to move the battery toward the opening and eject the battery through the opening while the battery-side terminal and the charger-side terminal are disconnected;

a terminal case provided on a second end of the battery storage chamber in the depth direction, the terminal case being open toward the opening;

a plurality of charger-side terminals provided in a manner such that the charger-side terminals extend in the depth direction of the battery storage chamber inside the terminal case;

a cover movable between a closed position and an open position and provided on the terminal case; and a cover spring configured to urge the cover to the closed position, wherein, at the closed position, the cover covers the plurality of charger-side terminals, wherein, at the open position, the cover is positioned away from the opening in the depth direction of the battery storage chamber with respect to the closed position and the plurality of charger-side terminals are exposed, and wherein the ejection spring is constituted of the cover spring.

5. The charger according to claim 4,
wherein holes formed on the cover at positions facing the plurality of charger-side terminals in the depth direction of the battery storage chamber when the cover is at the closed position, and
wherein the plurality of charger-side terminals pass through the holes when the cover moves from the closed position to the open position.

6. A charger configured to charge a battery, the charger comprising:
a battery storage chamber configured to accommodate the battery;
an opening formed on a first end of the battery chamber in a depth direction, the battery being attached to and detached from the battery storage chamber through the opening;
a charger-side terminal provided on the battery storage chamber, the charger-side terminal being connected to and disconnected from a battery-side terminal of the battery stored in the battery storage chamber;
an attaching and detaching mechanism configured to prevent the battery from moving toward the opening while the battery is stored in the battery storage chamber and the battery-side terminal and the charger-side terminal are connected and to eject a second end of the battery in the depth direction from the opening by disconnecting the battery-side terminal and the charger-side terminal,
wherein the attaching and detaching mechanism includes
a push-operation member provided at the opening,
a lock mechanism configured to prevent the battery from moving toward the opening by engaging with the battery while the battery-side terminal and the charger-side terminal are connected and to disengage from the battery when the push-operation member is pushed,
a release member configured to move in conjunction with the pushing operation of the push-operation member, to engage with the battery so as to move the battery toward the opening, and to disconnect the battery-side terminal and the charger-side terminal, and
an ejection spring configured to strike the battery so as to move the battery toward the opening and eject the battery through the opening while the battery-side terminal and the charger-side terminal are disconnected; and
a housing including an upper plate and a bottom plate parallel to each other, left and right side plates parallel to each other, and a backside plate connected to the rear edges of the upper plate, the bottom plate, and the left and right side plates,
wherein a plurality of battery storage chambers is aligned in a horizontal direction with the depth direction of the battery storage chambers being matched with the horizontal direction, the battery storage chambers being interposed between the left and right side plates and between the upper plate and the bottom plate,
wherein a plurality of attaching and detaching mechanisms is provided to correspond to the battery storage chambers,
wherein each of the battery storage chambers is defined by an upper wall being provided below the upper plate and partitioning the upper area of the battery storage chambers, a bottom wall being provided above the bottom plate and partitioning the lower area of the battery storage chambers, side walls extending from the upper wall to the bottom wall and partitioning the sides of adjacent battery storage chambers, and a rear wall being provided in front of the backside plate and partitioning the rear area of the battery storage chambers,
wherein openings are each defined by the front edges of the upper wall, the bottom wall, and the side walls, and
wherein the charger-side terminals are provided at the rear edge of the bottom wall or the lower edge of the rear wall.

7. The charger according to claim 6, wherein the push-operation member is disposed in a space provided below the opening and between the bottom plate and the bottom wall.

8. A charger configured to charge a battery, the charger comprising:
a battery storage chamber configured to accommodate the battery;
an opening formed on a first end of the battery chamber in a depth direction, the battery being attached to and detached from the battery storage chamber through the opening;
a charger-side terminal provided on the battery storage chamber, the charger-side terminal being connected to and disconnected from a battery-side terminal of the battery stored in the battery storage chamber;
an attaching and detaching mechanism configured to prevent the battery from moving toward the opening while the battery is stored in the battery storage chamber and the battery-side terminal and the charger-side terminal are connected and to eject a second end of the battery in the depth direction from the opening by disconnecting the battery-side terminal and the charger-side terminal,
wherein the attaching and detaching mechanism includes
a push-operation member provided at the opening,
a lock mechanism configured to prevent the battery from moving toward the opening by engaging with the battery while the battery-side terminal and the charger-side terminal are connected and to disengage from the battery when the push-operation member is pushed,
a release member configured to move in conjunction with the pushing operation of the push-operation member, to engage with the battery so as to move the battery toward the opening, and to disconnect the battery-side terminal and the charger-side terminal, and
an ejection spring configured to strike the battery so as to move the battery toward the opening and eject the battery through the opening while the battery-side terminal and the charger-side terminal are disconnected; and
a housing including an upper plate and a bottom plate parallel to each other, left and right side plates parallel to each other, and a backside plate connected to the rear edges of the upper plate, the bottom plate, and the left and right side plates,
wherein a plurality of battery storage chambers is aligned in a horizontal direction with the depth direction of the battery storage chambers being matched with the horizontal direction, the battery storage chambers being interposed between the left and right side plates and between the upper plate and the bottom plate,
wherein a plurality of attaching and detaching mechanisms is provided for each of the battery storage chambers,
wherein each of the battery storage chambers is defined by an upper wall being provided below the upper plate and partitioning the upper area of the battery storage chambers, a bottom wall being provided above the bottom plate and partitioning the lower area of the battery storage chambers, side walls extending from the upper wall to the bottom wall and partitioning adjacent battery storage chambers, and a rear wall being provided in front of the backside plate and partitioning the rear area of the battery storage chambers, wherein the opening is defined by the upper wall, the bottom wall, and the side walls, wherein the charger-side terminals are provided at the rear edge of the bottom wall or the lower edge of the rear wall, and wherein the lock mechanism includes
- a sliding member extending in the depth direction of the battery storage chamber and being configured to slide in the depth direction when the push-operation member is pushed,
- a locking claw movably supported on a wall portion of the battery storage chamber in a direction intersecting with a sliding direction of the sliding member, being latchable to the battery-side latching portion provided on the battery, and being urged in a direction of latching the locking claw to the battery-side latching portion, and
- a cam portion provided on the sliding member and configured to engage with the locking claw so as to move the locking claw in a direction of releasing the locking claw from the battery-side latching portion when the sliding member moves by pushing the push-operation member.

9. The charger according to claim 8,
wherein the release member includes a release lever slidably supported on the bottom wall, and
wherein the release lever connected to the sliding member disconnects the battery-side terminal and the charger-side terminal by sliding when the sliding member moves by the push operation of the push-operation member, engaging with the battery after the lacking claw is released from the battery-side latching portion, and moving the battery toward the opening.

10. The charger according to claim 9, wherein the connection between the release lever and the sliding member is established by a pin provided on the sliding member engaging with a long hole formed in the release lever.

11. The charger according to claim 1,
wherein the battery-side terminal is provided on the first end of the battery in the depth direction,
wherein the charger-side terminal is provided on the second end of the battery storage chamber in the depth direction, and
wherein the second end in the depth direction of the battery stored in the battery storage chamber is positioned in the vicinity of the opening when the battery-side terminal and the charger-side terminal are connected, and the second end of the battery in the depth direction is ejected from the opening by the ejection spring.

12. The charger according to claim 1, wherein the release member engages with the first end of the battery in the depth direction when the battery is moved toward the opening.

13. The charger according to claim 1, wherein the ejection spring strikes the first end of the battery in the depth direction.

14. The charger according to claim 1, wherein the battery storage chamber accommodates a large-capacity battery for broadcasting equipment, the battery being attached to and detached from the broadcasting equipment.

\* \* \* \* \*